(12) United States Patent
Odoom

(10) Patent No.: US 11,254,221 B2
(45) Date of Patent: Feb. 22, 2022

(54) POWER SUPPLY FOR ELECTRIC VEHICLES USING 3-PHASE ALTERNATING CURRENT INDUCTION MOTOR AND TRANSFORMER COMPONENTS

(71) Applicant: Hyiamang Safo Odoom, Akron, OH (US)

(72) Inventor: Hyiamang Safo Odoom, Akron, OH (US)

( * ) Notice: Subject to any disclaimer, the term of this patent is extended or adjusted under 35 U.S.C. 154(b) by 0 days.

(21) Appl. No.: 16/542,069

(22) Filed: Aug. 15, 2019

(65) Prior Publication Data
US 2021/0046828 A1 Feb. 18, 2021

(51) Int. Cl.
*B60L 50/51* (2019.01)
*H01F 27/28* (2006.01)
*H02K 3/00* (2006.01)
*H02K 17/12* (2006.01)

(52) U.S. Cl.
CPC ............ *B60L 50/51* (2019.02); *H01F 27/28* (2013.01); *H02K 3/00* (2013.01); *H02K 17/12* (2013.01)

(58) Field of Classification Search
CPC .......... B60L 50/51; H01F 27/28; H02K 3/00; H02K 17/12; Y02T 10/70
See application file for complete search history.

(56) References Cited

U.S. PATENT DOCUMENTS

| 593,138 | A | 3/1897 | Tesla | |
| 8,387,728 | B1* | 3/2013 | Larke | B60K 1/00 180/65.1 |
| 2005/0011688 | A1* | 1/2005 | Bailey, Sr. | F01B 17/022 180/65.1 |
| 2008/0303459 | A1* | 12/2008 | Furukawa | B60K 6/46 318/142 |
| 2012/0262018 | A1* | 10/2012 | Thiara | H02K 53/00 310/113 |

FOREIGN PATENT DOCUMENTS

WO WO-2012090215 A1 * 7/2012 ............. H02K 53/00

* cited by examiner

*Primary Examiner* — Michael C Zarroli

(57) ABSTRACT

Components for generating power using some mechanical gears combined with electric components are wired to generate electricity to power electric vehicles, including a 3-phase alternator, a combination of transformers, an extended shaft in union with the main shaft of the starter motor, a system of pulleys, and a rotating belt. Using a pattern of engineering to assemble these apparatuses and combining these tools with a source of electricity generate a high voltage of electricity that passes through wires that is decreased to a low voltage enables low current to be used to operate electric vehicles.

14 Claims, 8 Drawing Sheets

POWER SUPPLY FOR ELECTRIC VEHICLES USING 3-PHASE ALTERNATING CURRENT INDUCTION MOTOR AND TRANSFORMER COMPONENTS

BACKGROUND AND ANY PROBLEM WITH THE "PRIOR ART"

There are recharging stations that users of electric vehicles charge their vehicles if they have no motive power. Charging the batteries of electric vehicles ensures the cars have motive power. However, the ultimate solution to the power supply to an electric vehicle is using a 3-phase alternating current induction motor and transformer components, namely—a step-up transformer, a substation transformer, and a step-down transformer. This novel idea or process involves using a combination of a 3-phase alternating current motor, a step-up transformer, a substation transformer, and a step-down transformer and attaching these by wires to supply the motive power for electric vehicles.

OBJECT OF THE INVENTION

This combination of a 3-phase alternating current motor, a step-up transformer, a substation transformer, and a step-down transformer to supply power for electric vehicles will transform the global automotive landscape. The reason for this assertion is that this combination will help bring to death, the vehicular internal combustible engine that depends on petroleum or gas. The comfortability arising from using a combination of a 3-phase alternating current induction motor, a step-up transformer, a substation transformer, and a step-down transformer is immense; there is cost-cutting because the battery pack is eliminated and the problem of disposal of the lithium battery is curtailed or reduced if not eliminated once and for all. It must be noted that the 3-phase alternating current induction motor, the step-up transformer, the substation transformer, and the step-down transformer are friendly environmentally in comparison to lithium batteries. Also, with the battery pack eliminated, it will be cheaper to produce more electric vehicles and more people will drive electric vehicles. Again, with many people driving electric vehicles, the production of gases that emanate from driving internal combustible vehicles will decrease because electric vehicles do not produce gases. The usage of a 3-phase alternating current induction motor and electrical transformers as providers of motive power for electric vehicles then will eliminate most of the problems that come from gas-driven vehicles.

The use of an electric transformer in the transfer of electricity is well known since Tesla patented it in 1897. It is used in electricity transfer that is in stepping up and stepping down voltages so that industries and residential homes can have access to higher capacities and safer power supply. Also, an autotransformer is used in the ignition system in the internal combustion engine of gas-powered vehicles. Despite the use of transformers in electrical systems, no effort has been made to use a combination of 3-phase alternating current induction motor that is protected from water and transformer components—step-up transformer, substation transformer, and step-down transformer as propulsive power for electric vehicles. This invention is using a 3-phase alternating current induction motor and electrical transformer components, namely step-up transformer, substation transformer, and step-down transformer as a means of providing power supply to electric vehicles.

SUMMARY OF THE INVENTION

This invention involves a process of supplying power to electric vehicles using a 3-phase alternating current induction motor and attaching it to transformer components of a step-up transformer, a substation transformer, and a step-down transformer. In this, there is adding a shaft to the other side of the main shaft of the starter motor thus, the two sides of the starter motor will have shafts that will spin or stop at the same time. Thus, at a stop sign when the electric vehicle stops, the two shafts will stop spinning; when the electric vehicle starts because the main shaft of the starter motor spins, both shafts spin at the same time. For stability and support, the long shaft is passed through an end-capped pivot that is attached to the floor of the chassis and this long shaft will be in union with a large diametric pulley that will connect a belt that is attached to the small diametric pulley and which is attached to the extended shaft; the extended shaft is attached to the main shaft of the starter motor by a couple. In this case, the large diametric pulley connects a belt too and is in union with the small diametric pulley.

Thus, the belt which is in union with the small diametric pulley is also in union with the long shaft; through the large diametric pulley such that when the starter motor spins, the extended shaft which is in union with the main shaft of the starter motor that is connected on the other side of the starter motor spins and provides rotational energy to the belt and this belt spins the large diametric pulley that is attached to the long shaft. Thus, when the electric vehicle is in motion, because the main shaft of the starter motor spins, the attached extended shaft also spins and triggers the small diametric pulley to rotate because it is attached to and is in union with the belt.

The belt, thus, obtains its rotational energy from the movement of the extended shaft attached to the shaft of the starter motor and turns the large diametric pulley that is attached to and is in union with the long shaft. Thus, as the electric vehicle moves, the belt turns the extended shaft that is coupled or attached to the main shaft of the starter motor or turns the two pulleys and when the electric vehicle stops, because the rotary motion has ceased, the belt also stops rotating.

The cessation of the movement of the electric vehicle causes the long shaft to stop spinning and the attached 3-phase alternating current induction motor stops to spin and the 3-phase alternating current induction motor does not generate electricity. Thus, the 3-phase alternating current induction motor is coupled to the pulley that is attached to the long shaft so that when this long shaft is rotating because it is triggered by the belt, the 3-phase alternating current induction motor rotates and generates electricity that is transferred through the step-up transformer, the substation transformer, and the step-down transformer to the control panel of the electric vehicle for distribution to all needed parts of the electric vehicle.

It is a well-known fact that an alternating current induction motor charges a battery in a car. It is well-known that transformers route electricity from alternators to factories and residential areas. However, the idea of using a 3-phase alternating current induction motor and a combination of transformer components—a step-up transformer, a substation transformer, and a step-down transformer as a process to power an electric vehicle is a novel idea.

When the electric vehicle reaches a traffic stop, the starter motor stops, and the extended shaft that is attached to the main shaft of the starter motor also stops spinning and this causes the belt which is in union with the small diametric pulley that is attached to the extended shaft to stop spinning and this cessation affects the long shaft and the attached large diametric pulley ceases to spin causing the 3-phase alternating current induction motor to cease generating electricity through the step-up transformer, the substation transformer, and the step-down transformer.

However, the electric vehicle starts moving again when the accelerator is stepped on because the motor starter battery is active, the main shaft of the starter motor starts to spin again and the extended shaft coupled to the main shaft of the starter motor too starts to spin and provide rotational energy to the belt; the connected large diametric pulley also spins and turns the long shaft that then spins the attached 3-phase alternating current induction motor so that the 3-phase alternating current induction motor generates electricity that passes through the transformer components—the step-up transformer, the substation transformer, and the step-down transformer so that the electric vehicle is supplied motive energy again.

Figure 1:
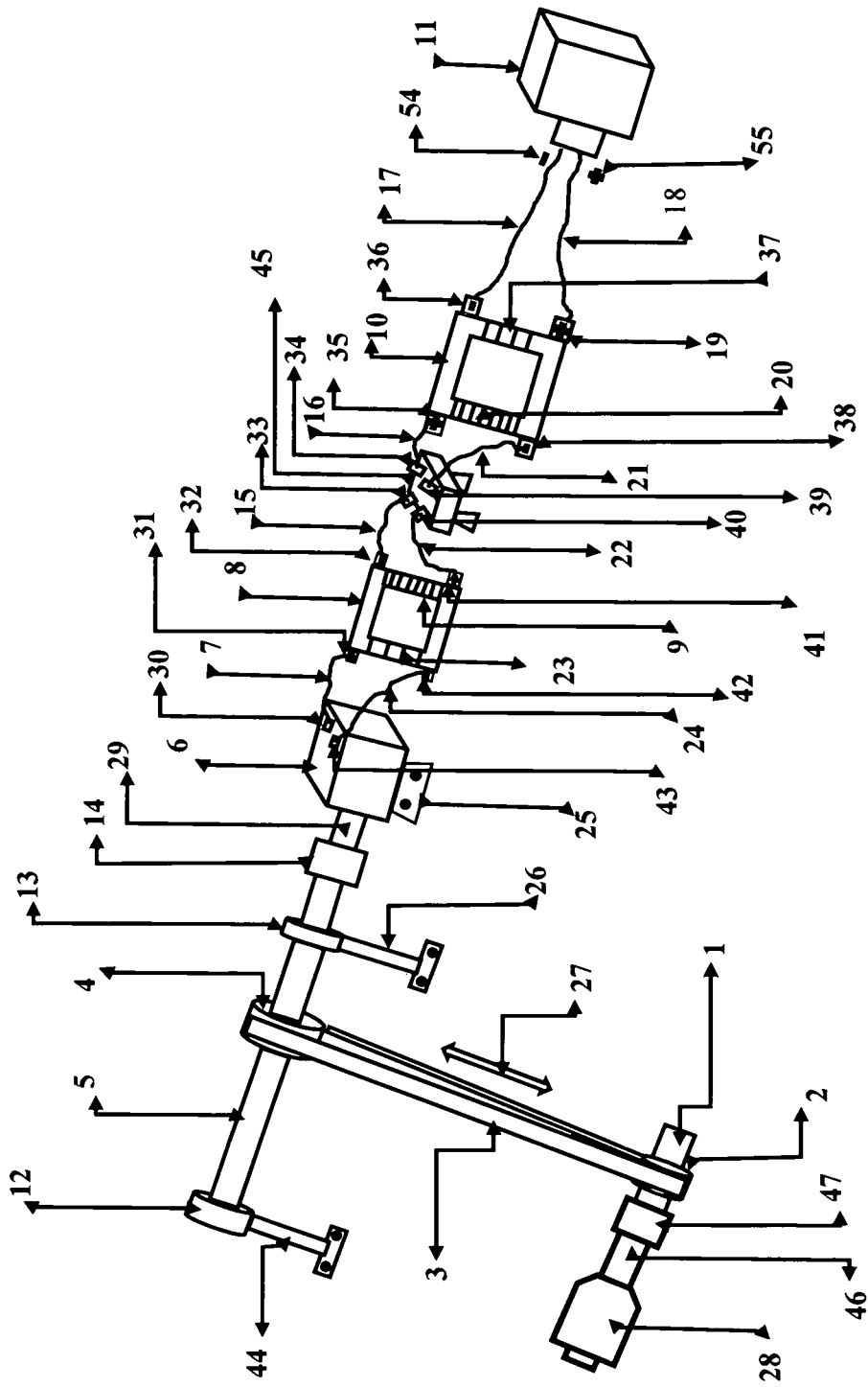
FIG. 1 is a perspective view of the assembly of the various parts in a manner as indicated by this invention and the necessary connections that are needed for the operation of this invention.
Figure 2:
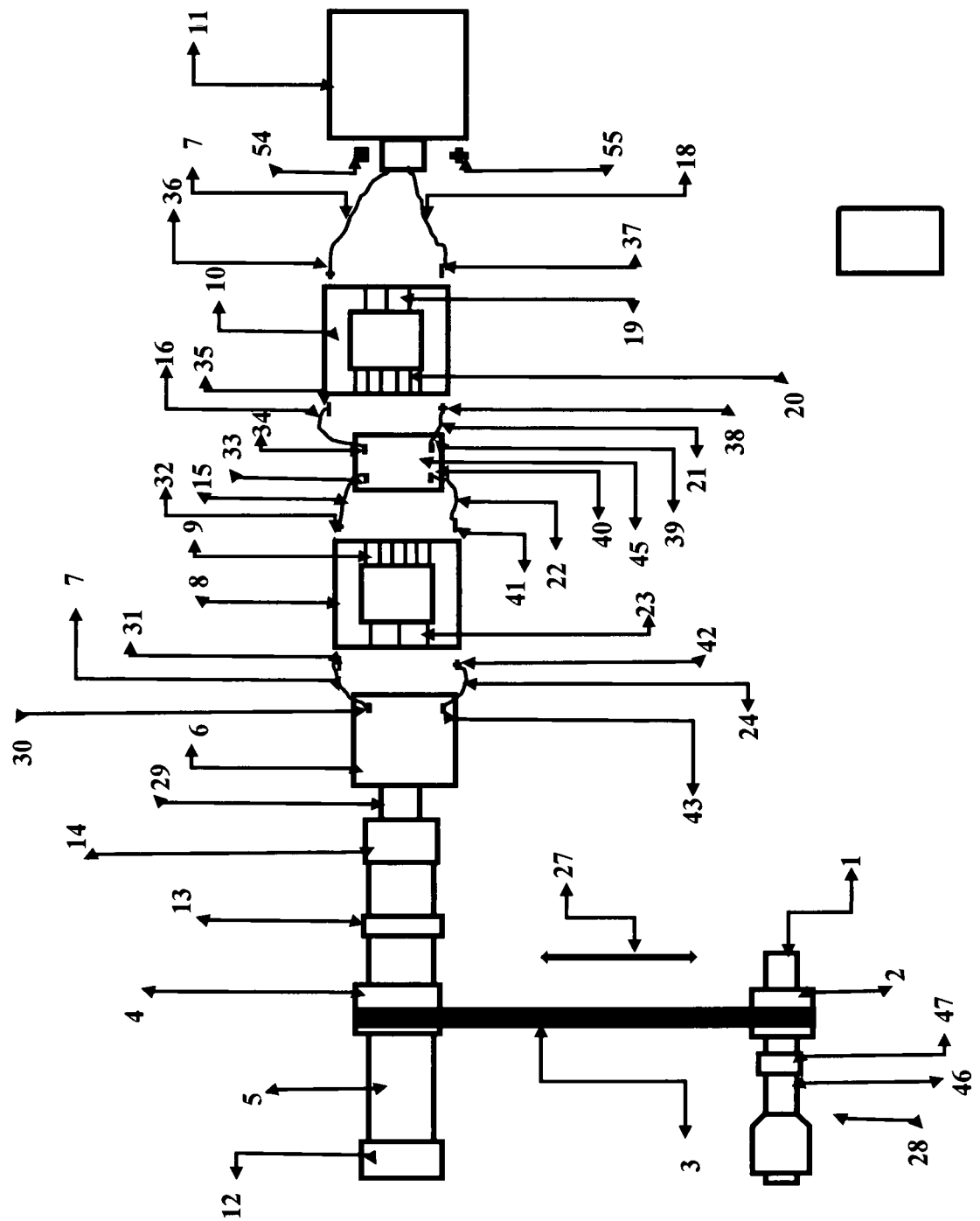
FIG. 2 is the top plan view of this invention and the needed connections that are necessary for the operation of this invention.
Figure 3:
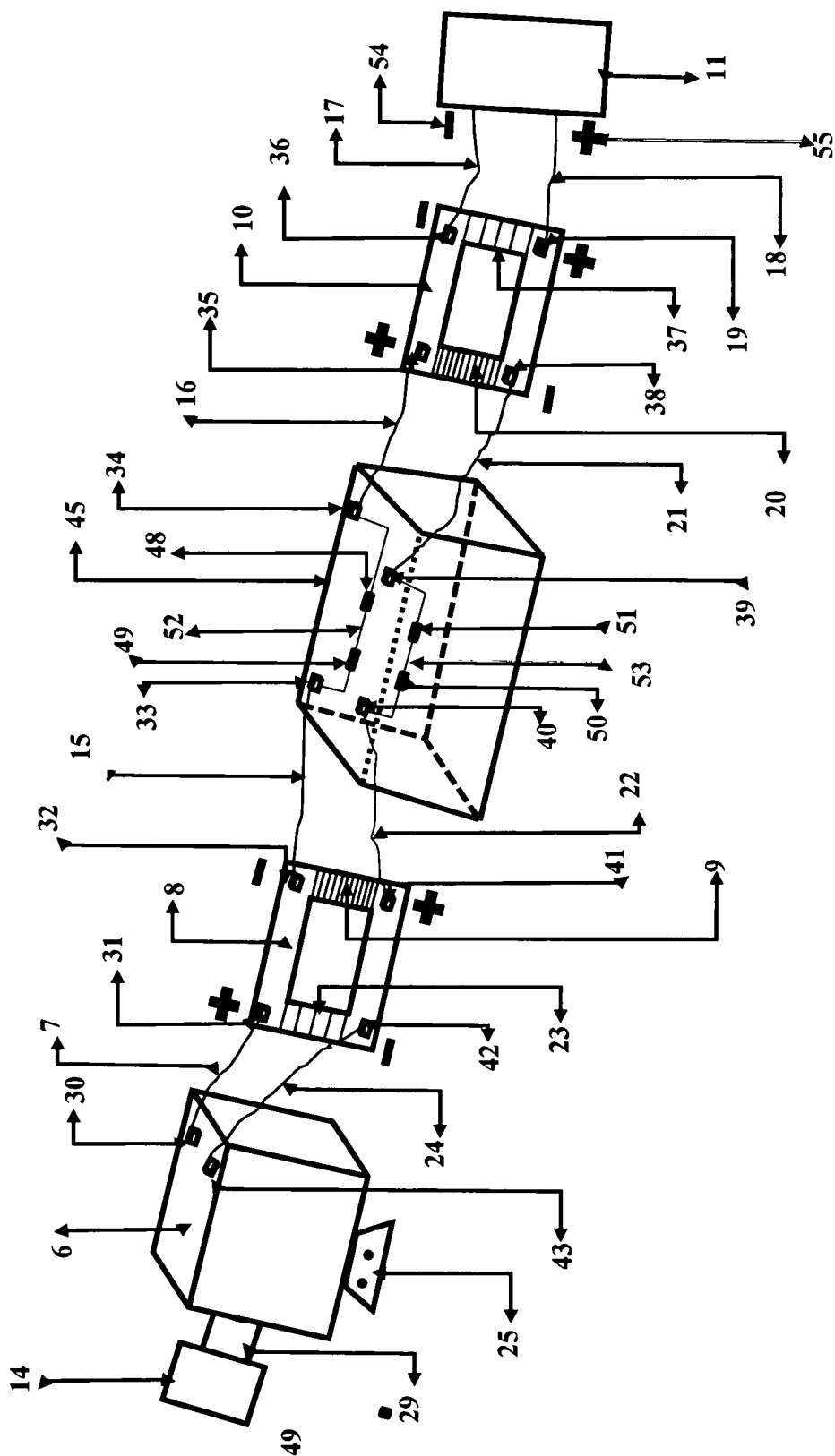
FIGS. 3, 4, 5, 6, 7, and 8 are preferred embodiments and are as described in detailed in this application.
Figure 4:
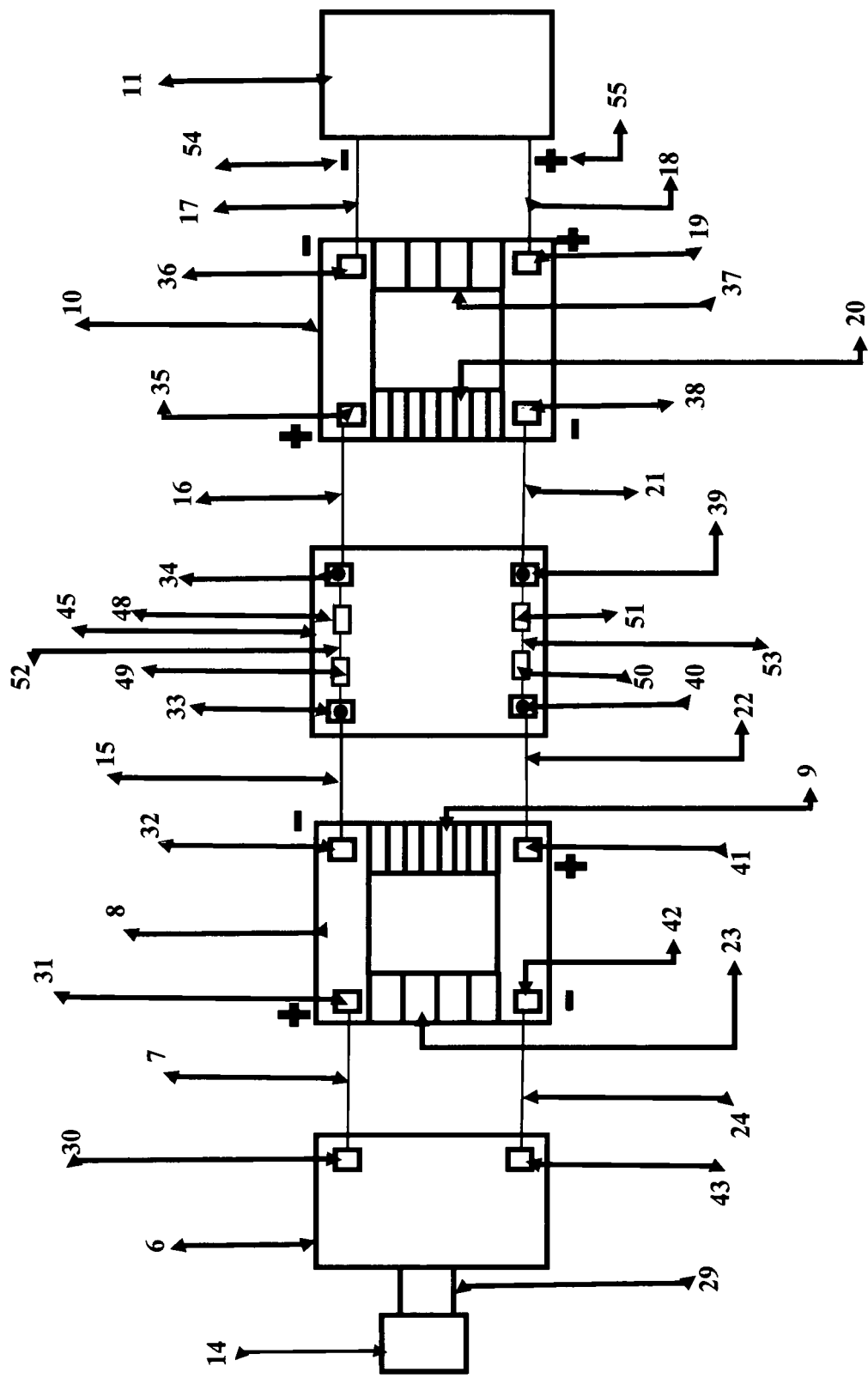

This process for generating electricity for an electric vehicle is arranged as described for the fully functioning of the invention. The assemblage comprises the following parts:—(1) Extended shaft that is in union with the main shaft (46) of the starter motor (28) is inserted in and bound tightly to (2). (2) Small diametric pulley bound to (2) and has a belt (3) connecting (2) to (4) and (3) and it provides rotational energy to turn pulleys (2) and (4) when turned by the extended shaft (1) that is attached by a couple (47) to the main shaft (46) of the starter motor (28). (4) Large diametric pulley connected to (2) by a belt (3) and it is attached to a long shaft (5) which is inserted into pulley (4). (5) Long shaft is in pivots (12) and (13) and the long shaft (5) spins freely in these pivots (12) and (13); long shaft (5) has an end-capped pivot (12) so that it (the long shaft (5)) will not slip out. (5) is attached and coupled to shaft (29) of (6) at (14).

(6) 3-phase alternating current induction motor. (7) Wire that connects terminal (30) of 3-phase alternating current induction motor to the positive terminal of (8). (8) High voltage step-up transformer. (9) Secondary coils of the high voltage step-up transformer. (10) Low voltage step-down transformer. (11) Control panel; it will distribute low voltage current to the electric vehicle. (12) End-capped pivot in which the long shaft (5) freely spins or rotates. (13) Pivot in which the long shaft (5) freely spins or rotates. (14) Couple, binding the long shaft (5) and the shaft (29) of the 3-phase alternating current induction motor (6). (15) Wire connecting terminal (32) of the step-up transformer and terminal (33) of the substation transformer (45). (16) Wire connecting terminal 34 of the substation transformer (45) and the positive terminal of the low voltage step-down transformer (10). (17) Wire connecting the negative terminal of the low voltage step-down transformer (10) and negative terminal of the control panel for electricity distribution. (18) Wire from positive terminal (19) of the low voltage step-down transformer (10) to the positive terminal of the control panel for electricity distribution. (19) positive terminal of the low voltage step-down transformer (10), wire (18) connects the low voltage step-down transformer to the control panel.

(20) Secondary coils of the low voltage step-down transformer (10). (21) Wire connecting negative terminal (38) of the low voltage step-down transformer (10). (22) Wire connecting positive terminal (41) of the high voltage step-up transformer to the terminal (40) of the substation transformer (45). (23) Primary coils of the high voltage step-up transformer (8). (24) Wire connecting the 3-phase alternating current induction motor (6) terminal (43) to negative terminal (42) of the high voltage step-up transformer (8). (25) Metal bearing supporting the 3-phase alternating current induction motor (6) for stability. (26) Metal bearing supporting pivot (13) holding and allowing free spin of the long shaft (5). (27) Directional movement of the belt (3). (28) Starter motor (28) has its main shaft (46) in a couple (47) and is attached to the extended shaft (1); the extended shaft (1) is attached to the small diametric pulley (2). (29) Shaft of the 3-phase alternating current induction motor coupled to the long shaft (5) at (14).

(30) Terminal of the 3-phase alternating current induction motor (6). (31) Positive terminal of the high voltage step-up transformer (8) connects to the terminal (30) of the 3-phase alternating current induction motor (6). (32) Negative terminal of the high voltage step-up transformer (8) connects to the terminal (33) by wire (15). (33) Terminal of the substation transformer (45) connects to the negative terminal (32) of the high voltage step-up transformer (8). (34) Terminal of the substation transformer (45) connects to the low voltage step-down transformer by wire (16) at the positive terminal (35). (35) Positive terminal of the low voltage step-down transformer. (36) Negative terminal of the low voltage step-down transformer which connects to the control panel (11) by wire (17). (37) Primary coils of the low voltage step-down transformer. (38) Negative terminal of the low voltage step-down transformer. (39) Terminal of the substation transformer (45). (40) terminal of the substation transformer (45) connects to the positive terminal (41) of the high voltage step-up transformer (8) by wire (22). (41) Positive terminal of the high voltage step-up transformer connects to the substation transformer (45) by wire (22) at the terminal (40).

Figure 5:
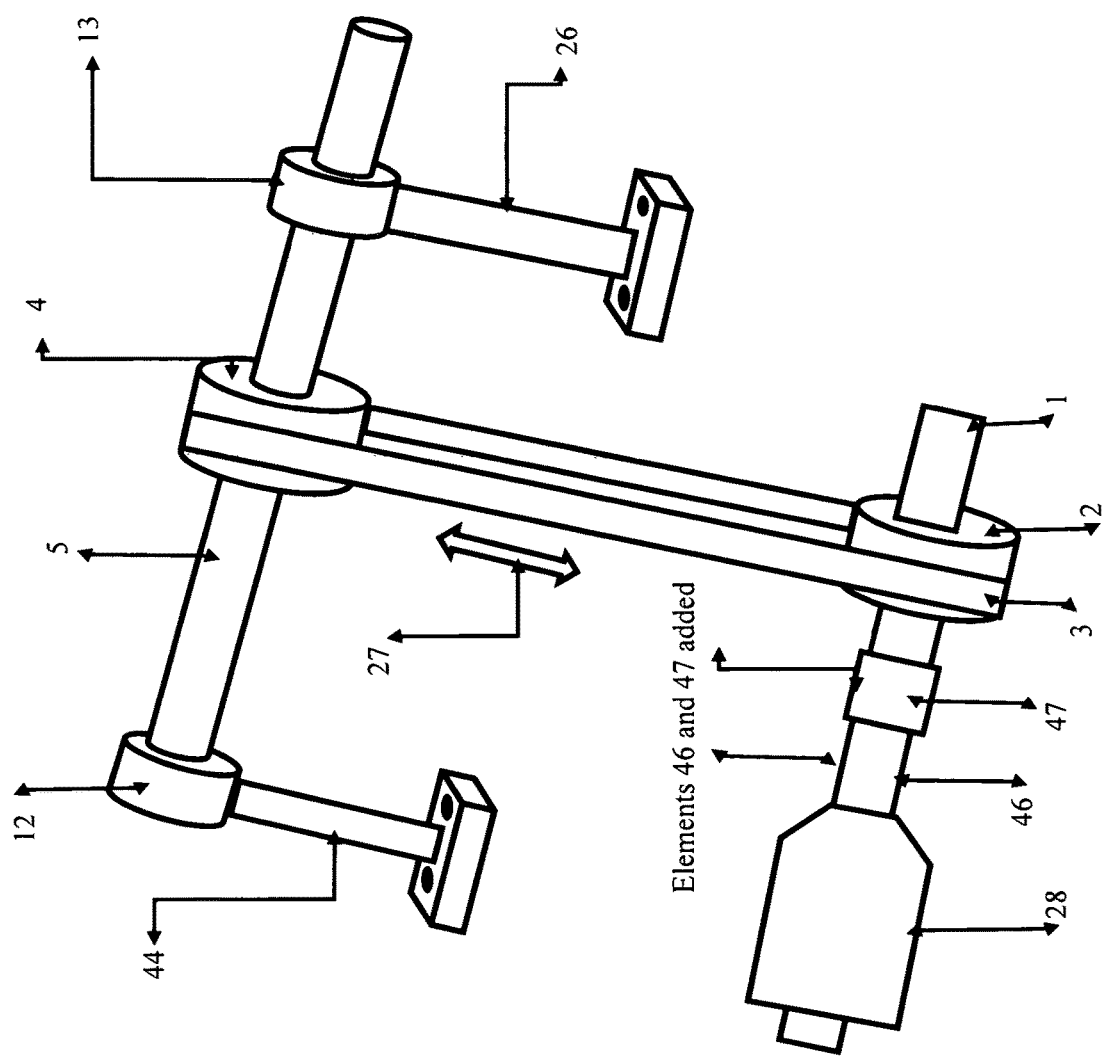
Figure 6:
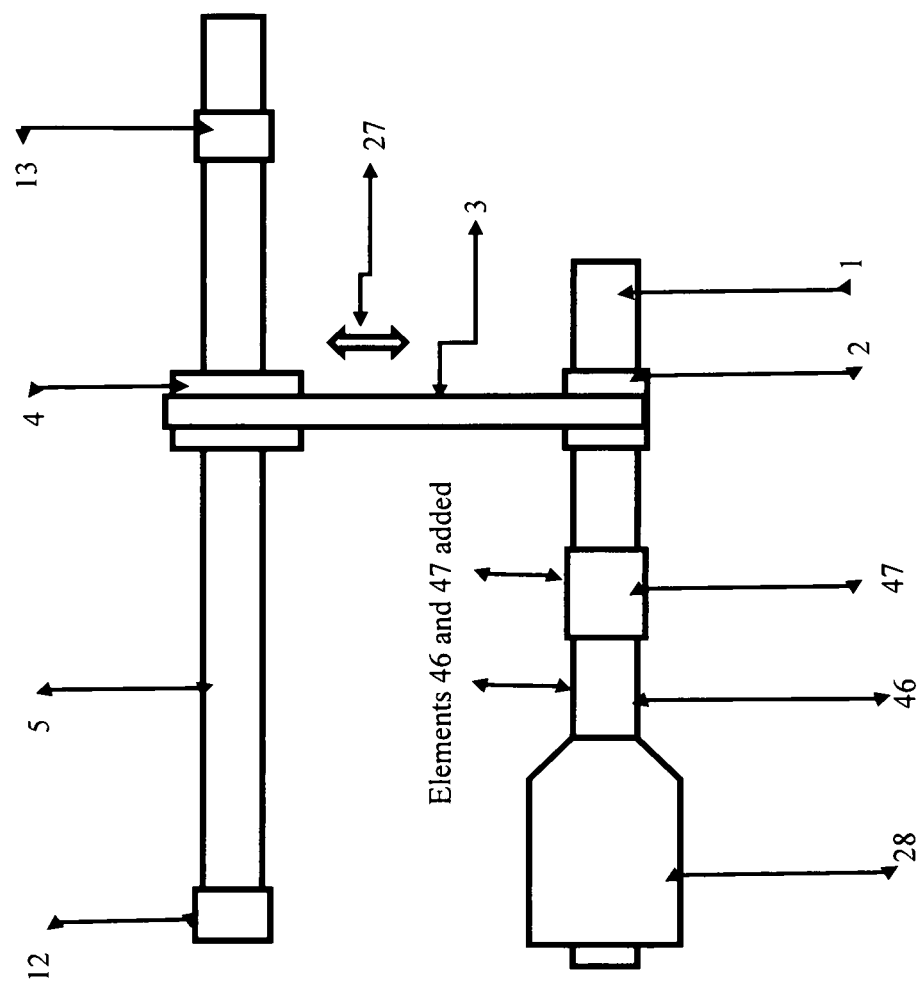
Figure 7:
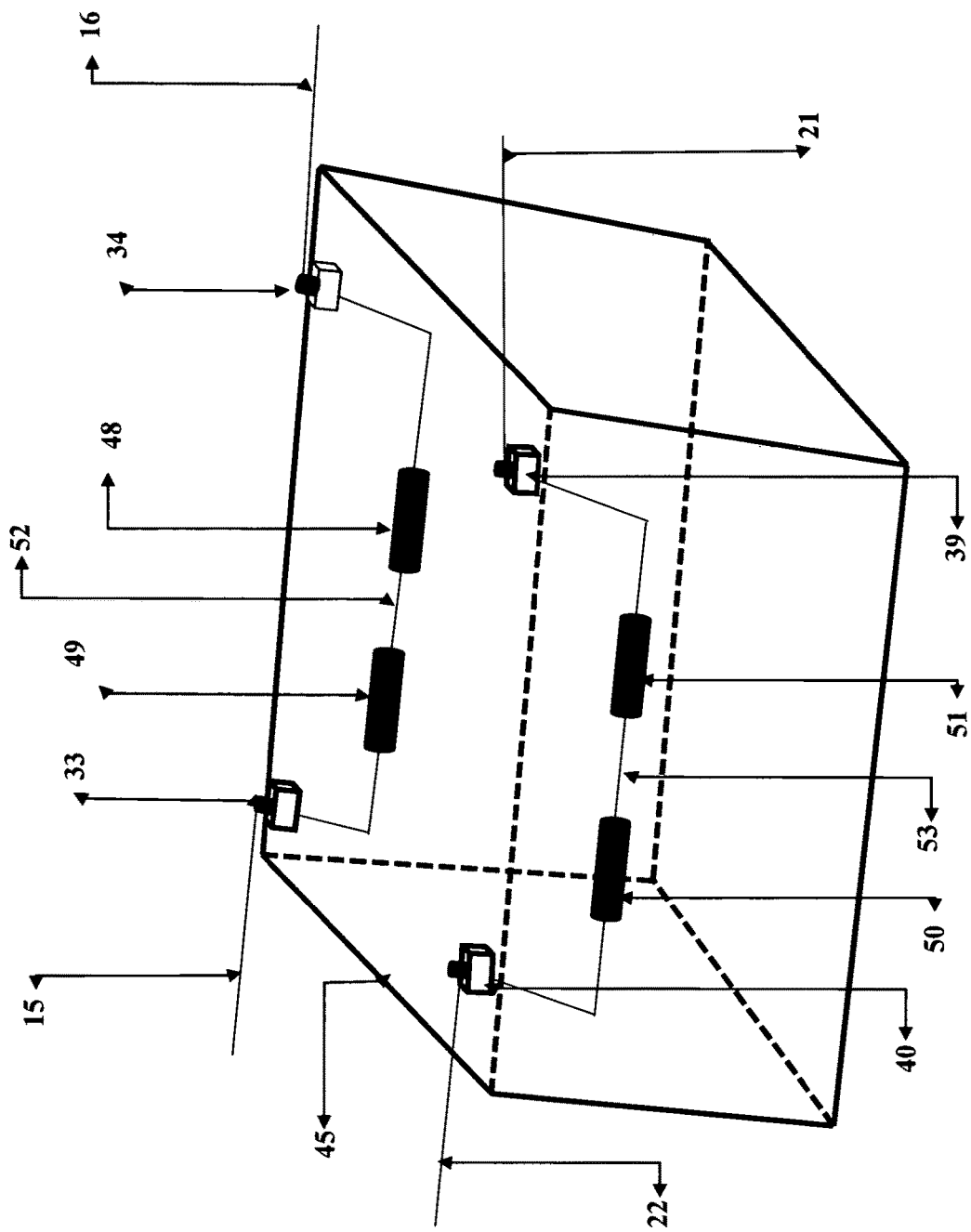
Figure 8:
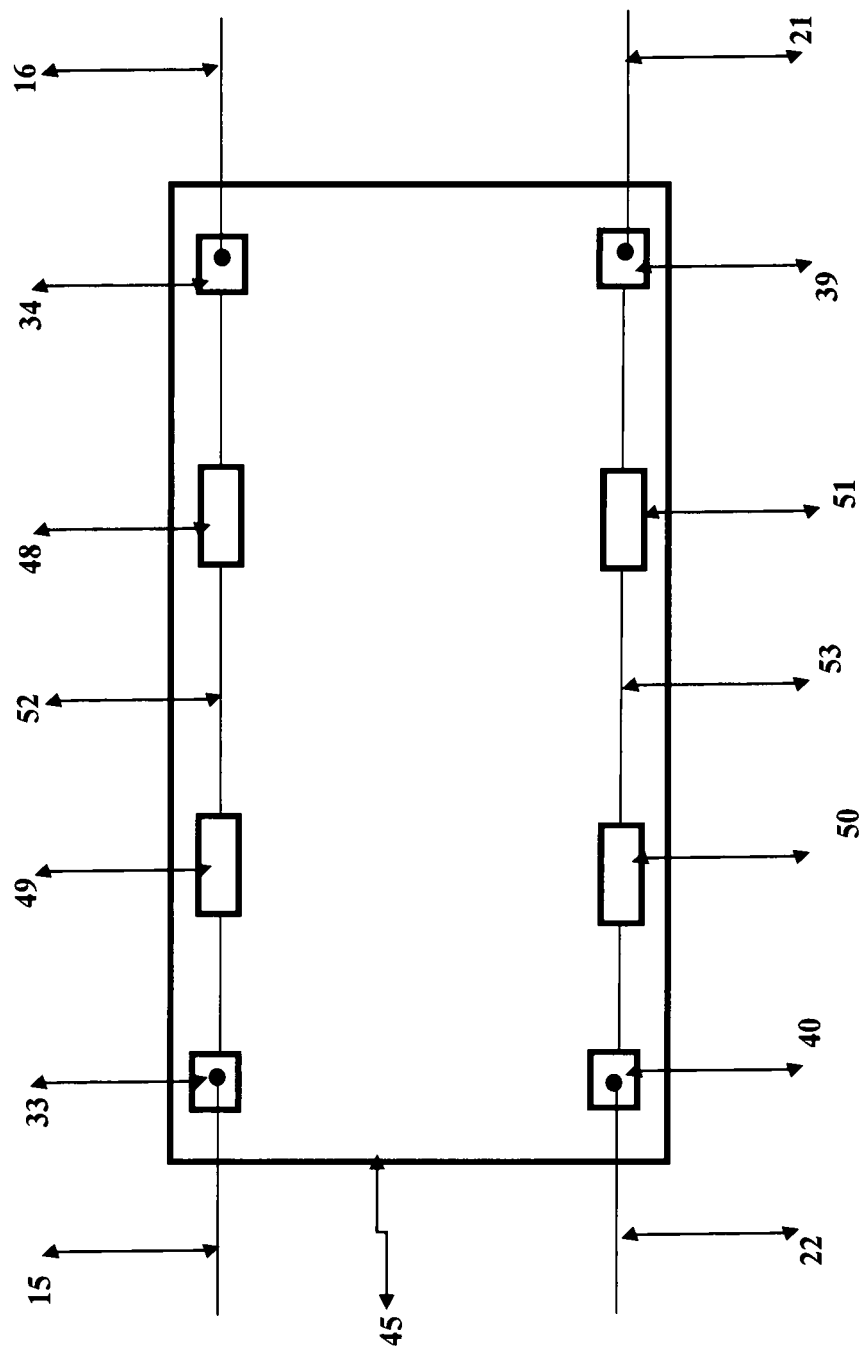

(42) Negative terminal of the high voltage step-up transformer (8) and connects to the terminal (43) of the 3-phase alternating current induction motor by wire (24). (43) Terminal of the 3-phase alternating current induction motor which connects the negative terminal (42) of the high voltage step-up transformer (8) by wire (24). (44) Metal bearing supporting the end-capped pivot (12). (45) Substation transformer, where the high voltage from the step-up transformer goes through and this power is decreased to a lower voltage and transferred by the step-down transformer to the control panel for distribution to all needed parts of the electric vehicle. (46) is the main shaft; it is attached to the extended shaft with a couple 47. (47) Is a couple that attaches the main shaft (46) of the starter motor and the extended shaft (1) such that when the main shaft (46) of the starter motor (28) turns, the extended shaft (1) also turns the attached small diametric pulley 2; the small diametric pulley 2 turns the large diametric pulley 4 because the belt 3 is attached to both pulleys 2 and 4 (see FIG. 5, FIG. 6 is a plan view of this assemblage); and the large diametric pulley 4 also turns the long shaft 5. (48) Resistor, (49) resistor, (50) resistor, (51) resistor (52) wire that connects terminals (33) and (34), (53) wire that connects terminals (40) and (39). (54) The negative terminal of the control panel (11) and (55) the positive terminal of the control panel (11).

DETAILED DESCRIPTION OF THE INVENTION

The process involves the utilization of a 3-phase alternating current induction motor and the components of a transformer—a step-up transformer, a substation transformer, and a step-down transformer to generate power for electric vehicles will enable electric vehicle to travel on roads is shown in FIGS. 1, 2, 3, 4, 5, and 6, 7 and 8.

In this invention, as indicated in the terms step-up transformer, substation transformer, and step-down transformer are descriptive (see preamble to claims). Thus, the step-up transformer represents high voltage, the substation transformer represents an intervening transformer that changes the high voltage to low voltage using resistors connected to the terminals (of the substation transformer), and the step-down transformer represents the low voltage that comes from the resistors that can be arranged in series or parallel. The detailed drawings are shown in FIGS. 3, 4, 7, and 8.

Thus, with a particular reference to the FIGS. 1, 2, 3, 4, 5, 6, 7 and 8 of this invention, the numbers used in the illustrations represent similar parts in all the drawings, using a method when all the parts are customarily assembled in this way will supply power to electric vehicles: the extended shaft 1 is an appendage of the main (drive) shaft 46 of starter motor 28 because it is coupled at 47; 2 is a small diametric pulley which is in union with the extended shaft 1. The small diametric pulley 2 allows a belt 3 to connect large diametric pulley 4 such that when the extended shaft 1 is energized and excited because it is coupled to the main shaft 46 of the starter motor 28 which is spinning, the attached extended shaft 1 spins and supplies rotational energy to belt 3 and the belt 3 rotates the large diametric pulley 4 that is attached to the long shaft 5.

Component 5 is the long shaft which is in union with the large diametric pulley 4 and the long shaft 5 also has an attachment of 3-phase alternating current induction motor 6 is in a couple at 14. The long shaft 5 spins freely in an end-capped pivot 12 supported by metal bearing 44 and has another pivot 13 supported by 26 metal bearing support and these two are attached to the chassis floor of the electric vehicle. The end-capped pivot 12 prevents the long shaft 5 from slipping out (of the pivot) as the long shaft 5 spins freely in the cylindrical hole of the large diametric pulley. Pivot 13 allows the long shaft 5 to spin freely and at the same time, 44 metal bearing provides support to the long shaft 5. Another attachment to the long shaft 5 is a 3-phase alternating current induction motor 6; the shaft of the 3-phase alternator 29, is in a couple at 14 with the long shaft 5.

When the starter motor is turned on or the electric vehicle is started, the main shaft 46 of the starter motor 28 is excited and spins and causes the extended shaft 1 to which it is attached to spin and turn the small diametric pulley 2. Pulley 2 provides rotational energy to the belt 3 to spin the large diametric pulley 4 which it (belt 3) is in union with and spins the long shaft 5 (because pulley 4 is attached to the long shaft). This long shaft also spins the 3-phase alternating current induction motor 6 which by principle generates electricity.

This 3-phase alternating current induction motor 6 has two terminal ends 30 and 43; these two ends 30 and 43 are connected by wires 7 and 24 to the two terminal ends 31 and 42 respectively of the step-up transformer 8 and the other two terminals 32 and 41 are then connected by two wires 15 and 22 respectively to terminals 33 and 40 of the substation transformer 45 where the voltage is stepped-down to a lower voltage. Substation transformer 45 also has terminals 34 and 39; and wire 16 connects terminal 34 of the substation transformer 45 to the positive terminal 35 of the step-down transformer and wire 21 connects the substation transformer terminal 39 and negative terminal 38 of the step-down transformer 10.

From the step-down transformer 10, a lower voltage of electricity is transferred to the control panel 11 for distribution to all parts or accessories of the electric vehicle to make the vehicle operative. Such transfer of electricity to the control panel 11 is through the terminals 36 and 19 of the step-down transformer 10; wire 17 transfers power from the negative terminal of the step-down transformer 10 to the negative terminal 54 of the control panel 11; and wire 18 transfers power from the positive terminal of the step-down transformer 10 to the positive terminal 55 of the control panel 11.

When the electric vehicle stops at a traffic light, for example, the main shaft 46 of the starter motor 28 ceases to spin, and there is no motion for the electric vehicle. As the main shaft 46 of the starter motor 28 stops spinning, the extended shaft 1 attached to the main shaft 46 of the starter motor 28 also stops spinning. The belt 3 is turned by the small diametric pulley 2, and as 2 is attached to the extended shaft 1 that is coupled at 47 to the main shaft 46 of the starter motor now stops because the main shaft 46 of the starter motor is not spinning, the belt now does not have the energy to rotate pulleys 2 and 4 and the long shaft 5 ceases to spin or rotate the 3-phase alternating current induction motor 6. The cessation of spinning of the long shaft causes the 3-phase alternating current induction motor 6 to cease generating electricity. Thus, the transformer components:—the step-up transformer 8, the substation transformer 45, and the step-down transformer 10 do not have electricity flowing through wires 17 and 18 to the control panel 11 to distribute power to the needed parts of the electric vehicle.

When the green light of the traffic light is on and when the accelerator is applied, and because the starter motor 28 picks power from the starter battery, the main shaft 46 of the starter motor 28 spins and the extended shaft 1 spins and provides rotational energy to belt 3 which turns belt 2 and belt 4, and the long shaft 5 rotates and spins the 3-phase alternating current induction motor 6 and the 3-phase alternating current induction motor 6 generates electricity that passes through the step-up transformer 8, the substation transformer 45, and the step-down transformer 10 through the wire 17 to the terminal 54 and the wire 18 to the terminal 55 of the control panel 11 to send power to all the parts of the electric vehicle to make the electric vehicle operative.

DETAIL DESCRIPTION OF THE PREFERRED EMBODIMENTS (FIGS. 3, 4, 5 AND 6)

In the open and cut off drawings of the substation transformer 45, (FIGS. 3, 4, 7, and 8) terminals 33 and 34 are connected by the wire 52. Resistors act as voltage droppers and limit current values in electronic circuitry. Thus, in this invention, the high voltage from the step-up transformer has to be decreased to low voltage make it feasible for safe use by electric vehicles. So in this invention, resistors are used to lower the high voltage to a lower voltage so that the components can be used by electric vehicles. This wire, 52 has two resistors 48 and 49 that are in series; similarly, wire 53 has two resistors 50 and 51 that are in series, and these resistors drop the high voltage from the step-up transformer 8 to a low voltage that is transferred through the terminals 34 and 39 through the wire 16 and 21 respectively to the terminals 35 and 38 of the step-down transformer 10; a low voltage that is needed for the safe use by the electric vehicle. This low voltage now at the step-down transformer is transferred through the wires 17 and 18 to the terminals 54 and 55 respectively to the control panel 11 for distribution to all the needed parts of the electric vehicle.

Resistors that are used to drop a high voltage from the step-up transformer so that a low voltage can be transferred to a step-down transformer can also be connected in parallel. The preferred embodiment FIGS. 3, 4, 7, and 8 show parts of the substation transformer 45 that have been cut off to show the inside. These parts removed to show the inside of the substation transformer are the top and front. The substation transformer 45 receives high voltage from the step-up transformer 8 through these terminals—32 and 41 which are connected by wires 15 and 22. Wire 15 connects terminal 32 of the step-up transformer to terminal 33 of the substation transformer. Wire 22 connects terminal 41 of the step-up transformer to terminal 40 of the substation transformer 45.

What is claimed is novel method and chosen to be protected in the following claims:

1. A power supply for electric vehicles in motion comprising a 3-phase alternating current induction motor whose output is rectified from alternating current to direct current, an extended shaft is connected to the main shaft of a starter motor by a couple, a small diametric pulley, a belt, a large diametric pulley, a long shaft, a step-up transformer, a substation transformer, a step-down transformer, and wires connected to a control panel:
    a) wherein said extended shaft is coupled to said main shaft of the starter motor located at the opposite side of said main shaft of the starter motor and is for attaching of said small diametric pulley;
    b) wherein said small diametric pulley is attached to said extended shaft connected to the main shaft of the starter motor by a couple and is in union with said belt and connected to said large diametric pulley with said belt such that when said small diametric pulley with said belt turns, said large diametric pulley also turns;
    c) wherein said large diametric pulley is attached to said long shaft or said 3-phase alternating current induction motor such that said large diametric pulley is in union with said belt such that when said large diametric pulley rotates, said long shaft or 3-phase alternating current induction motor also rotates;
    d) wherein said long shaft has said 3-phase alternating current induction motor as an attachment such that said long shaft rotates with said 3-phase alternating current induction motor when said belt rotates said large diametric pulley;
    e) wherein said 3-phase alternating current induction motor is connected to said step-up transformer by said wires and transfer high voltage electricity from terminal poles of said 3-phase alternating current induction motor to the positive and negative poles of said step-up transformer through the primary coils;
    f) wherein said step-up transformer has both positive and negative poles connected by said wires accept high voltage electricity through the primary coils and the high voltage electricity is transferred from the positive and negative poles of the secondary coils to the terminal poles of said substation transformer to reduce the high voltage;
    g) wherein said substation transformer accepts high voltage from said step-up transformer and reduces the high voltage to a low voltage and transfers the low voltage by said wires connected from its terminals to the positive and negative poles of said step-down transformer secondary coils; and
    h) wherein the primary coils of said step-down transformer transfers the low voltage by said wires to the positive and negative poles of to the control panel for distribution to all the accessories of the electric vehicle.

2. Said extended shaft is coupled to said main starter motor of claim 1, wherein said extended shaft attached to said main shaft of the starter motor allows an attachment of said small diametric pulley and said pulley is in union with said belt such that when said small diametric pulley turns, said belt also turns.

3. Said extended shaft of said main starter motor of claim 1, wherein said extended shaft is a metal with a thickness of at least half of an inch and coupled to said main shaft of the starter motor is attached to said small diametric pulley.

4. Said small diametric pulley of claim 1, wherein said small diametric pulley is at least one and a half inches in thickness and has said belt as an attachment such that when said small diametric pulley turns, said belt also turns.

5. Said belt of claim 1, wherein said belt is pliable, made of rubber or plastic and reinforced with metal strips to prevent easy breakage.

6. Said belt of claim 1, wherein said belt that connects said small diametric pulley and said large diametric pulley is at least one-quarter of an inch in diameter.

7. Said long shaft of claim 1, wherein said long shaft is metal and has a thickness of at least half of an inch in diameter and is coupled to said 3-phase alternating current induction motor such that when new long shaft turns, said 3-phase alternating current induction motor also turns.

8. Said large diametric pulley of claim 1, wherein said large diametric pulley is at least two inches in diameter and is connected to said small diametric pulley by said belt of claim 1.

9. Said 3-phase alternating current induction motor of claim 1, wherein said 3-phase alternating current motor is of least 10 volts in capacity and delivers the current to said step-up transformer.

10. Said step-up transformer of claim 1, wherein said step-up transformer is at least 50 volts in capacity and transfers such voltage to said substation transformer to process to a lower voltage.

11. Said substation transformer of claim 1, wherein said substation transformer accepts the high voltage, reduces the high voltage to a low voltage and transfers the low voltage current to said step-down transformer to said control panel.

12. Said step-down transformer of claim 1, wherein said step-down transformer transfers a low voltage current of at least 1.0 volt of each slot in the said control panel for distribution to all accessories of the electric vehicle.

13. Said 3-phase alternating current induction motor of claim 1, said step-up transformer of claim 1, said substation transformer of claim 1, and said step-down transformer of claim 1, wherein said step-up transformer, said substation transformer, and step-down transformer are connected in series, transfer electricity to said control panel to all needed parts of the electric vehicles.

14. Said 3-phase alternating current induction motor of claim 1, said step-up transformer of claim 1, said substation transformer of claim 1, and said step-down transformer of claim 1, wherein said 3-phase alternating current induction motor, said step-up transformer, said substation transformer, and said step-down transformer are connected in parallel, transfer electricity through said wires to said control panel to all needed parts of the electric vehicles.

\* \* \* \* \*